United States Patent [19]

Cohen et al.

[11] 3,838,406

[45] Sept. 24, 1974

[54] MAGNETO-RESISTIVE MAGNETIC DOMAIN DETECTOR

[75] Inventors: Leonard D. Cohen, Brooklyn, N.Y.; Brian A. Shortt; Michael J. Urban, both of Framingham, Mass.

[73] Assignee: GTE Laboratories Incorporated, Waltham, Mass.

[22] Filed: Mar. 23, 1973

[21] Appl. No.: 344,376

[52] U.S. Cl. 340/174 EB, 340/174 RC, 340/174 TF

[51] Int. Cl. .............................................. G11c 11/14

[58] Field of Search ................. 340/174 EB, 174 TF

[56] References Cited

UNITED STATES PATENTS

| | | | |
|---|---|---|---|
| 3,493,943 | 2/1970 | Raffel | 340/174 EB |
| 3,701,128 | 10/1972 | Copeland | 340/174 EB |
| 3,736,419 | 5/1973 | Almasi et al. | 340/174 TF |

*Primary Examiner*—James W. Moffitt
*Attorney, Agent, or Firm*—Irving M. Kriegsman; Robert A. Walsh

[57] ABSTRACT

A cylindrical magnetic domain detector is formed of a pair of series coupled magneto-resistive elements which are disposed in magnetic coupling relationship with a cylindrical magnetic domain memory position, each detector element in quadrature arrangement can be piecewise distributed in sections of arbitrary length. An undesirable signal due to the rotating magnetic field generates an extraneous signal in the respective elements which differ in phase by 180°. The arrangement of these elements results in suppressing these extraneous signals at the output of the detector.

9 Claims, 8 Drawing Figures

MAGNETO-RESISTIVE MAGNETIC DOMAIN DETECTOR

FIELD OF THE INVENTION

This invention relates to magnetic domain memories. More specifically, this invention relates to a detector of cylindrical domains circulated in a magnetic domain memory.

BACKGROUND OF THE INVENTION

Magentic domain memory devices are well-known as, for example, described in the patents to Shafer U.S. Pat. Nos. 3,493,940 and 3,493,946. In recent years extensive investigations of magnetic domain behavior in single-crystal magnetic oxides have been made. Of particular interest in these investigations has been the behavior of cylindrical magnetic domains, also known as "bubbles." A recent article dealing with cylindrical domains is entitled "Application of Orthoferrites to Domain-Wall Devices" by Andrew H. Bobeck et al. which was published in the IEEE transaction on Magnetics, Vol. Mag-5, No. 3 of September, 1969 at page 544.

As described in this article, cylindrical magnetic domains can be created and moved about within a magnetic crystal platelet by subjecting such material to selectively controlled magnetic fields. The bubbles may be manipulated and moved in discrete steps with the aid of a pattern layer of bars formed of an easily magnetized and demagnetized material such as permalloy. Bubbles are attracted or repulsed by magnetic poles of the bar pattern with the poles being induced by an in-plane rotating magnetic field. The movement of the bubbles under the action of this magnetic field is from one discrete position on a bar to another bar position in correspondence with the rotation of the field.

Various techniques have been suggested and used to detect the bubbles as they are circulated in a magnetic domain memory. One known useful read-out technique makes use of the magneto-resistive effect of a thin-film stripe on the surface of the magnetic ferrite crystal to detect the presence of the radial fringing field surrounding each bubble. The thin-film stripe is commonly a 200 to 500 Angstrom thick stripe of a nickel-iron permalloy which exhibits a resistance change of about 1 percent in response to the magnetization change caused by the arrival of a bubble. This magneto-resistive thin-film elements are necessarily small so as to be of a comparable size to that of the magnetic cylindrical domain, which typically may be from three to eight microns in diameter.

The resistance sensing current permitted to flow in a magneto-resistive element for bubble detection is limited by the power dissipation of the thin magneto-resistive film which limits the current to a few milliamperes. As a result, the detectable voltage signal produced by a bubble is of the order of a millivolt or less depending upon the excitation current, resistance of the element, and its placement relative to the bubble in the memory.

In a typical magneto-resistive cylindrical domain detector, a bridge network is employed wherein one arm of the bridge consists of a magneto-resistive element located in proximity to a discrete bubble position. The excitation of the bridge is obtained with a direct current. A pulse which signifies the presence of a bubble has a magnitude of less than a millivolt and lasts for some fraction of the period of the cycle of rotation of the bubble driving in-plane magnetic field.

A difficulty encountered in the detection process arises by virtue of an extraneous signal introduced from the in-plane rotating magnetic field on the sensing portion of the magneto-resistive element. The millivolt bubble pulse is superimposed on the sinusoidal signal from the in-plane rotating magnetic field whose frequency is the same as that of the repetition rate of the bubble pulses. One method which seeks to eliminate the effect of this interference involves a direct current excited bridge network with terminals of the bubble detector connected to one arm of the bridge and a second (dummy) detector, added to the bubble circuit, connected to an opposite arm of the bridge. However, complete cancellation of the extraneous signal at the output terminals of the bridge cannot be achieved. One contributing factor is the difference in detector magneto-resistive properties that commonly occurs in the fabrication of the two spatially separate detectors. Complete cancellation requires that the two signals be exactly symmetrical. Therefore, an object of the present invention is to effectively remove the extraneous signal without the use of a bridge network.

SUMMARY OF THE INVENTION

In a cylindrical domain detector in accordance with the invention, where unique geometric shaping of the detector is used to create two series connected, quadrature detector elements, each detector element in the quadrature arrangement can be piecewise distributed in sections of arbitrary length. The shaping of the detector is accomplished by serially arranging segments of the detector in quadrature and in close proximity to the passageway or track which the bubble follows.

The terminals of the detector are connected to a constant current dc source and a capacitor to provide dc isolation from the source. The magnetic field created by the bubble circuit changes the resistance of the bubble detector elements which in turn vary the voltage at the output of the detector circuit. In such an arrangement, one element in the quadrature pair functions as a dummy detector, but since it is formed from the existing fan out portion of the bubble detector element, no additional elements need be added. Due to the quadrature displacement of the detector elements, the extraneous signal generated in the respective elements will differ in phase by 180°. The series connection of these elements results in suppression of the extraneous signal at the output of the detector.

The features of the present invention which are believed to be novel are set forth with particularity in the attendant claims. The invention, together with further objects and advantages thereof, may best be understood by reference to the following description taken in connection with the drawings. In the several figures, like reference numerals identify like elements.

DETAILED DESCRIPTION OF THE EMBODIMENT

Figure 1:
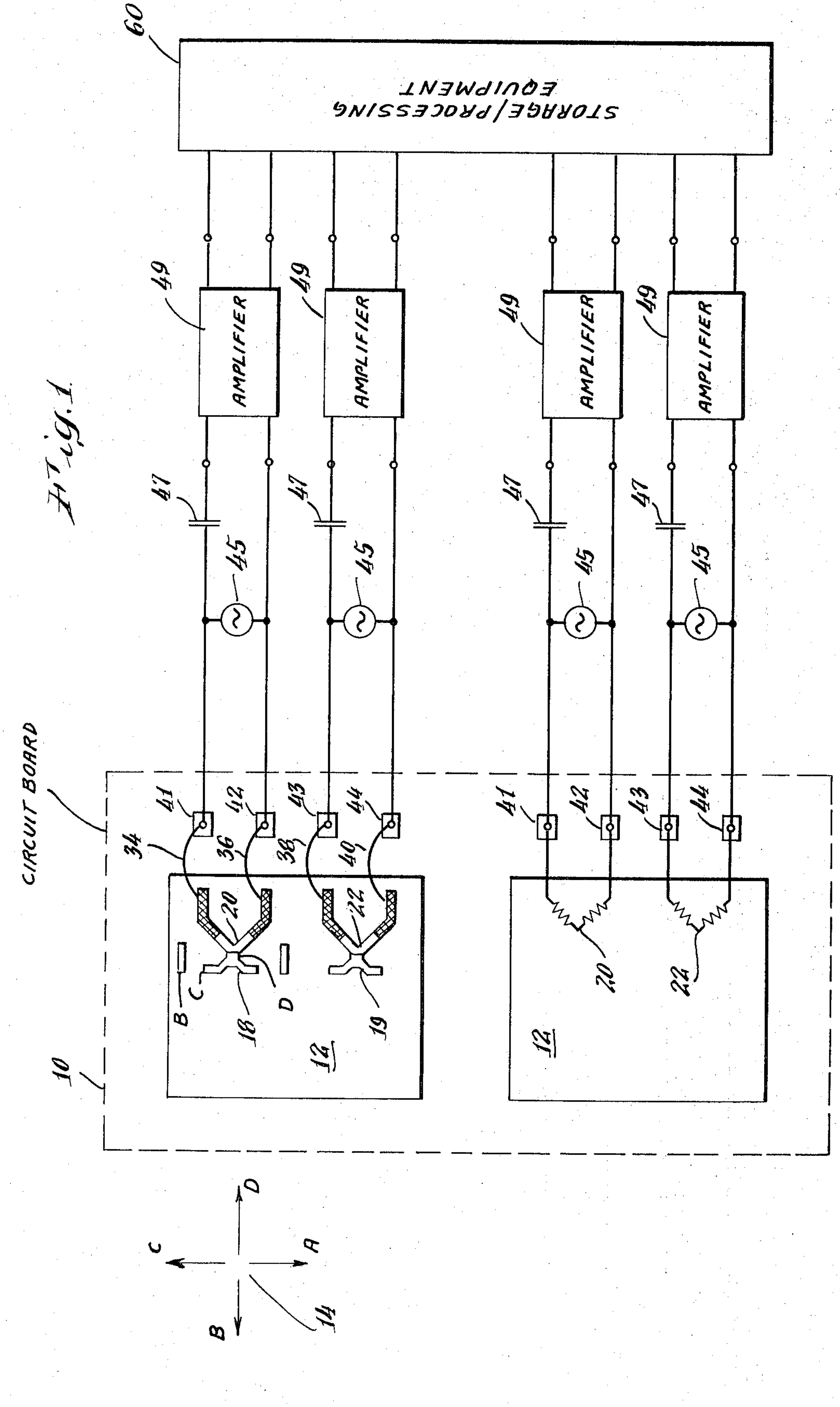
FIG. 1 is a schematic representation of the magneto-resistive detector in accordance with the invention.

With reference to FIG. 1, a circuit board 10 is shown which supports a plurality of platelets 12 forming magnetic bubble domain memories. The platelets 12 are formed of a suitable ferrite material and are subjected to a bubble sustaining magnetic field (not shown) and a bubble driving magnetic field whose rotation is represented by the various positions of arrows 14. The positions A, B, C and D indicate the direction of rotation of magnetic field 14. The sources and descriptive details for the generation of these magnetic fields are known and reference may be made to the aforementioned Bobeck article for further details.

The bubbles or cylindrical domains are circulated under drive action by the in-plane magnetic field which sequentially moves a bubble to discrete positions along circulating paths as determined by an easily magnetized and de-magnetized bar pattern of permalloy. Thus, for example, a bubble may move in corresponding sequence with the magnetic drive field from position B on bar 16 to positions C and D on Y-bar 18. The permalloy patterns 16, 18 are shown in greatly enlarged proportions in FIG. 2. In practice these patterns are quite small to enable a large quantity to fit on platelet 12.

The platelet 12 is provided with a pair of geometrically shaped resistive devices 20, 22. The magnetoresistive device 20 is located adjacent a discrete bubble position such as D of Y-bar 18 to sense the arrival of a bubble such as 28 (see FIG. 2) when the in-plane rotating magnetic field has the orientation D. Another magneto-resistive device 22 is associated with a Y-bar 19. Device 22 is either oriented just like device 20 relative to field 14 or shifted by 180° from that orientation.

The magneto-resistive devices 20, 22 are each etched into place on the surface of the magnetic crystal platelet 12 as a thin-film permalloy portion 24 having two segments, elements such as arms 24' and 24'' of length L at the lower end 26 of the Y-bar where a bubble 28 most strongly affects the resistance of the thin-film magneto-resistive segment 24. A gold conductor pattern 30 is placed over the thin-film segment 24 and terminates as shown in lines 31 and 32. The conductor pattern 30 enables the attachment of leads such as 34, 36, 38 and 40 (see FIG. 1) to drive current through elements 20, 22.

Bubble detection is based on magneto-resistive changes in the Permalloy film caused by the bubble. The magneto-resistive effect is such as to cause a change in the resistance measured at the terminals of the detector when the magnetization in the film is angularly displaced. For the detector shown in FIG. 1, the terminal resistance of the detector measured when the film magnetization is parallel to the direction of an impressed dc current differs from that measured when the magnetization is at right angles to the current. A rotation of film magnetization is affected by the magnetic field of a bubble.

In normal operation, the magnetization of the detector is not only angularly displaced by a bubble, when present, but it is continuously rotated by the rotating magnetic field required for propagation of a bubble.

This continuous rotation of film magnetization causes a continuous change in film resistance and is an extraneous effect. This extraneous signal simultaneously occurs with the signal generated by a bubble and is of a magnitude comparable to the bubble signal. Since the extraneous signal can interfere with and limit bubble detection sensitivity, suppression of this signal is desirable.

In the present invention, internal cancellation of the extraneous signal is obtained by the unique geometric shaping of the detector rather than by external circuit techniques such as using a bridge circuit. This internal cancellation technique eliminates the need for a bridge circuit and its associated external components and adjustments. The arrangement results in increased detection sensitivity.

Figure 2:
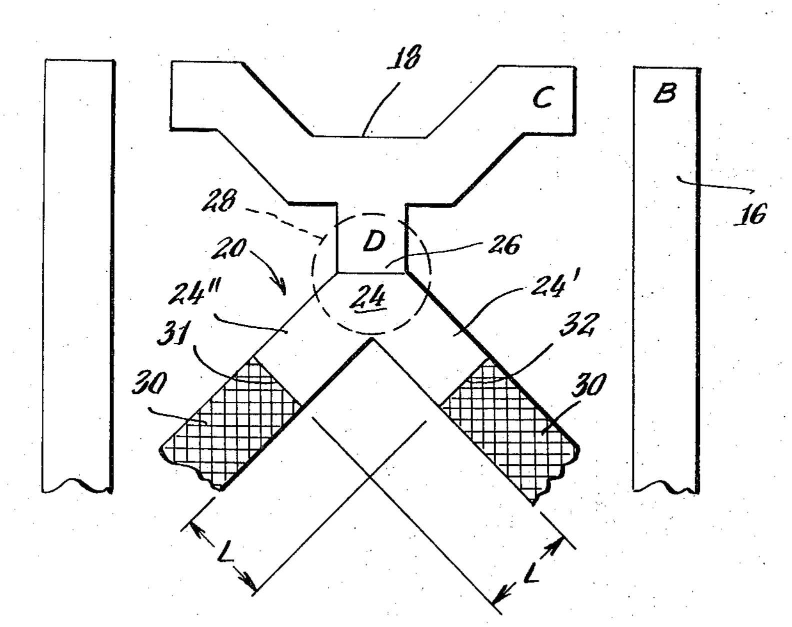
FIG. 2 is an enlarged schematic representation of a magneto-resistive element employed with a cylindrical domain detector in accordance with the invention.
Figures 3A, 3B, 3C, 3D, 3E, 3F:
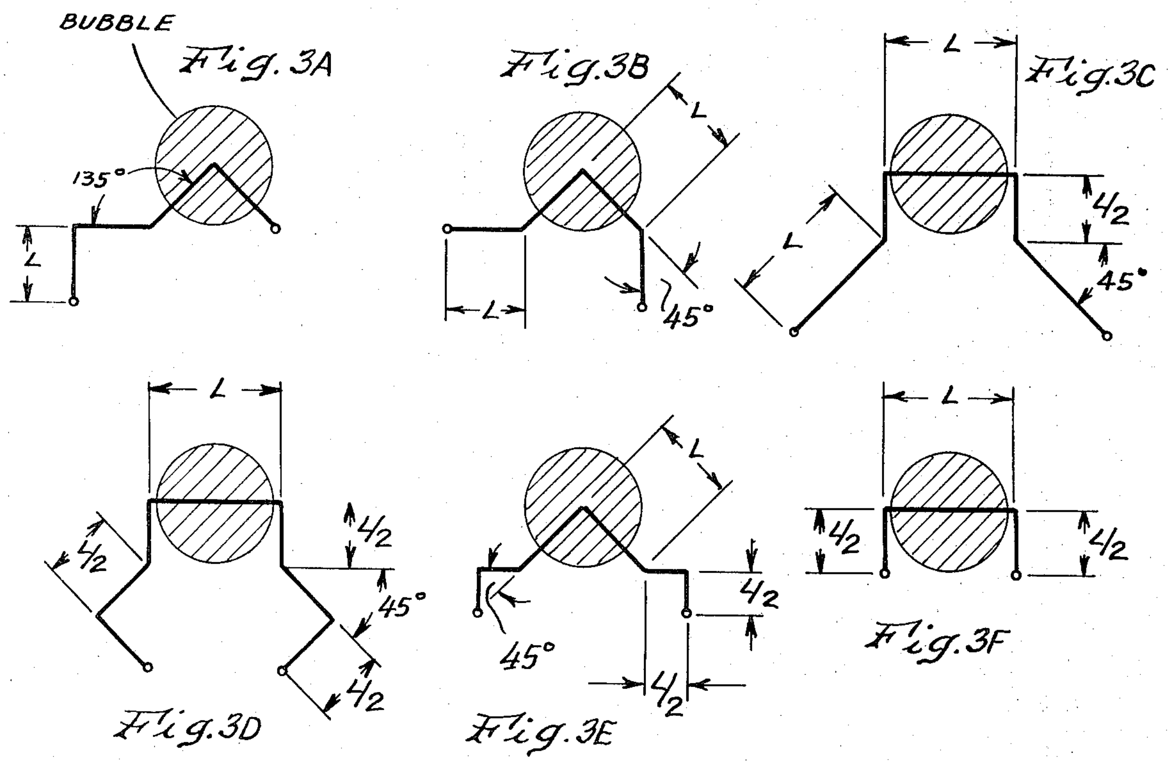
FIGS. 3A through 3F are schematic representations of several alternative embodiments of the detector device in accordance with the invention.

The detector shown in FIG. 1 and in an enlarged view in FIG. 2 has been shaped to provide for the desired cancellation effect and six of several alternate configurations are illustrated in FIG. 3. The detector device is shaped so as to constitute two series connected, quadrature elements or segments. These elements may be piecewise distributed; for example, the U-shaped device in FIGS. 3C, 3D, 3F, the two $l/2$ sections constitute one detector element and the bight section of length $l$ is the second element. In general, each detector element in the quadrature arrangement can be piecewise distributed in sections of arbitrary length. Due to the quadrature displacement of the detector elements, the extraneous signal generated in the respective elements will result in partial cancellation of the extraneous signal at the output part of the detector.

This shaping of the detector has accomplished cancellation without the need for an additional detector (dummy) as was required in the present state of the art detectors. In effect, one element in the quadrature pair functions as a dummy detector, but since it is formed from the existing fan out portion of the bubble detector element, no additional elements need be added. This arrangement has the further advantage that the detector elements are more spatially concentrated and hence can exhibit more uniform performance characteristics. Another advantage of the shaped detector arrangement is that the detector elements are integrally connected thereby eliminating the space required for interconnecting leads with separate detectors.

A circuit for use with this shaped detector technique is shown in FIG. 1. The terminals 41, 42, 43 and 44 of the detector are connected to a constant current dc source 45. The capacitor 47 connected to source 45 provides dc isolation from the source to the input of a conventional amplifier 49. The output of amplifier may then be applied to any external processing equipment 60. As previously described, the quadrature arrangement of the detector elements provides cancellation of the extraneous signal at the output terminals. If a bubble changes the resistance of the bubble detector element by an amount ΔR, the corresponding change in output voltage, ΔE, is given by:

$$\Delta E = I\Delta R$$

Comparing this output voltage to that obtained with the bridge arrangement shows that the detection sensitivity with the shaped detector arrangement is higher by a factor of two.

Complete suppression of the extraneous signal will be obtained if the signals are sinusoidal in waveform. In the case of complex waveforms, one quadrature pair of detector elements will provide only partial cancellation of the extraneous signal. The resistance anisotropy in the detector film is such that a generated extraneous signal of complex waveshape contains only even harmonics of the rotating magnetic field drive frequency. The effect of one quadrature pair is to cancel the 2, 6, 10 . . . harmonics. Cancellation of higher order harmonics is obtained by use of a second pair of quadrature elements which are oriented at 45° to the first pair. Each element in the two pairs of quadrature detectors may be piecewise distributed in sections of arbitrary length. The 45° arrangements are shown in FIG. 3. The combined effect of two quadrature pairs is to cancel the 2, 4, 6, 10, 12, 14 — harmonic components. Harmonic cancellation of the $n^{th}$ harmonic is obtained by angular displacement of detector elements or detector pairs by an angle given by $180/n°$.

In the operation of the bubble detector, assume that the in plane rotating magnetic field 14 has delivered a bubble 28 to the position indicated in FIG. 2. The radial magnetic field of the bubble affects the resistance in both legs of the device 20. This change in resistance is sufficient to produce an output pulse at the output of the detector 20. The output may be filtered, amplified and applied to flip-flop circuitry for storage and processing.

Having thus described a shaped magneto-resistive magnetic domain detector in accordance with the invention, its advantages may be understood. The bubbles are detected by shaped series connected, quadrature, detector elements to suppress extraneous signals generated by the rotating magnetic field.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. A detector of magnetic domains being circulated in a crystal of magnetic oxide between discrete positions determined by an overlay permalloy bar pattern, with the domains being moved under drive action from an in-plane magnetic field rotating at a drive frequency comprising:

a domain sensing magneto-resistive device formed of a continuous magneto-resistive segment arranged into series coupled elements which are oriented to form one pair of elements in quadrature relationship relative to each other, said continuous magneto-resistive segment being located on the crystal in proximity to a discrete magnetic domain position to register a change in resistance caused by the magnetic influence of a domain moved onto said discrete domain position; wherein at least one element in said continuous magneto-resistive segment is separated into series coupled distributed pieces which are oriented parallel to each other to respond with similar resistance changes; and means coupled to the magneto-resistive segment to produce an output signal representative of the change in resistance of the quadrature related to elements in the continuous magneto-resistive segment when a magnetic domain is located at said discrete magnetic domain position.

2. The magnetic domain detector as claimed in claim 1 wherein the elements of said continuous magneto-resistive segment are arranged in a V-shaped configuration where each arm of the V configuration has the same length.

3. The magnetic domain detector as claimed in claim 1 wherein the elements of said continuous magneto-resistive segment are arranged in a U-shaped configuration formed of a pair of arms and a bight located between the arms, where each arm is of the same length and where the bight is twice as long as one of the arms.

4. The magnetic domain detector as claimed in claim 1 wherein said continuous magneto-resistive segment is formed of two pairs of quadrature related elements with each element being oriented at a predetermined angle to each other.

5. The magnetic domain detector as claimed in claim 4 wherein one pair of said quadrature related elements are oriented at 45° to the second pair of quadrature related elements.

6. In an improved magnetic domain sensing circuit wherein said domains are circulated in a crystal of magnetic oxide between discrete positions determined by an overlay permalloy bar pattern with the domains being moved under drive action from an in-plane magnetic field rotating at a drive frequency, said circuit including means for converting changes in resistance in the sensing circuit into a voltage variation for use by external processing equipment, the improvement comprising:

a shaped domain sensing magneto-resistive device electrically connected to said current source, said device having at least two pairs of quadrature related segments which are series connected, with each pair being arranged in quadrature relative to the other pair and located on the crystal in proximity to a discrete magnetic domain position, both of said segments being located and responsive to the magnetic influence of a domain moved onto said discrete domain position whereby extraneous signals due to the rotating magnetic field are suppressed.

7. The magnetic domain circuit as claimed in claim 6 wherein the segments of said device are arranged in a U-shaped configuration formed of a pair of arms and a bight element located between the arms, where each arm is of the same length and where the bight is twice as long as one of the arms.

8. The magnetic domain circuit as claimed in claim 6 wherein at least one segment of said magneto-resistive device is separated into distributed series coupled pieces which are oriented parallel to each other to respond with similar resistance changes introduced by the in-plane magnetic drive field.

9. The magnetic domain circuit as claimed in claim 8 wherein one pair of said quadrature related segments are oriented at 45° to the second pair of quadrature segments.

* * * * *